United States Patent [19]

Chraplyvy et al.

[11] Patent Number: 5,027,435
[45] Date of Patent: Jun. 25, 1991

[54] OPTICAL COMMUNICATION SYSTEMS USING FABRY-PEROT CAVITIES

[75] Inventors: Andrew R. Chraplyvy, Matawan; Patrick P. Iannone, Edison; Ivan P. Kaminow, Holmdel; Tingye Li; Julian Stone, both of Rumson; Lawrence W. Stulz, Neptune; Robert W. Tkach, Little Silver, all of N.J.

[73] Assignee: AT&T Bell Laboratories, Murray Hill, N.J.

[21] Appl. No.: 303,525

[22] Filed: Jan. 27, 1989

Related U.S. Application Data

[63] Continuation-in-part of Ser. No. 72,956, Jul. 15, 1987.

[51] Int. Cl.$^5$ .................. H04B 10/00; H04J 14/02
[52] U.S. Cl. .................. 455/617; 455/610; 370/3
[58] Field of Search .............. 455/618, 613, 617, 615, 455/609, 610, 611, 612; 370/3; 350/96.16; 356/352; 372/28

[56] References Cited

U.S. PATENT DOCUMENTS 4,638,483  1/1987  Bowers .
4,751,477  6/1988  Ohba .................. 455/613

OTHER PUBLICATIONS

"FDM-FSK Star Network with a Tunable Optical Filter Demultiplexer", Electron. Lett., 8th Oct. 1987-vol. 23, No. 21, pp. 1102-1103 (1987).
"FDMA-FSK Star Network with a Tunable Optical Filter Demultiplexer", Journal of Lightwave Technology-9th Sep. 1988-vol. 6, No. 9, pp. 1406-1414.

Primary Examiner—Reinhard J. Eisenzopf
Assistant Examiner—L. Van Beek
Attorney, Agent, or Firm—Eli Weiss

[57] ABSTRACT

One aspect of the invention is a Fabry-Perot cavity which has in part a waveguiding portion and in part a nonwaveguiding portion. In this manner, a cavity is constructed whose length would be too short to manipulate effectively if it were comprises exclusively of a waveguiding portion, and whose length might have unacceptable diffraction losses if it were comprised exclusively of a nonwaveguiding portion. In the inventive device the resonant wavelength can be adjusted by varying the length of either the gap or the waveguide or both. The device can be advantageously constructed and aligned using fiber coupling technology.

9 Claims, 5 Drawing Sheets

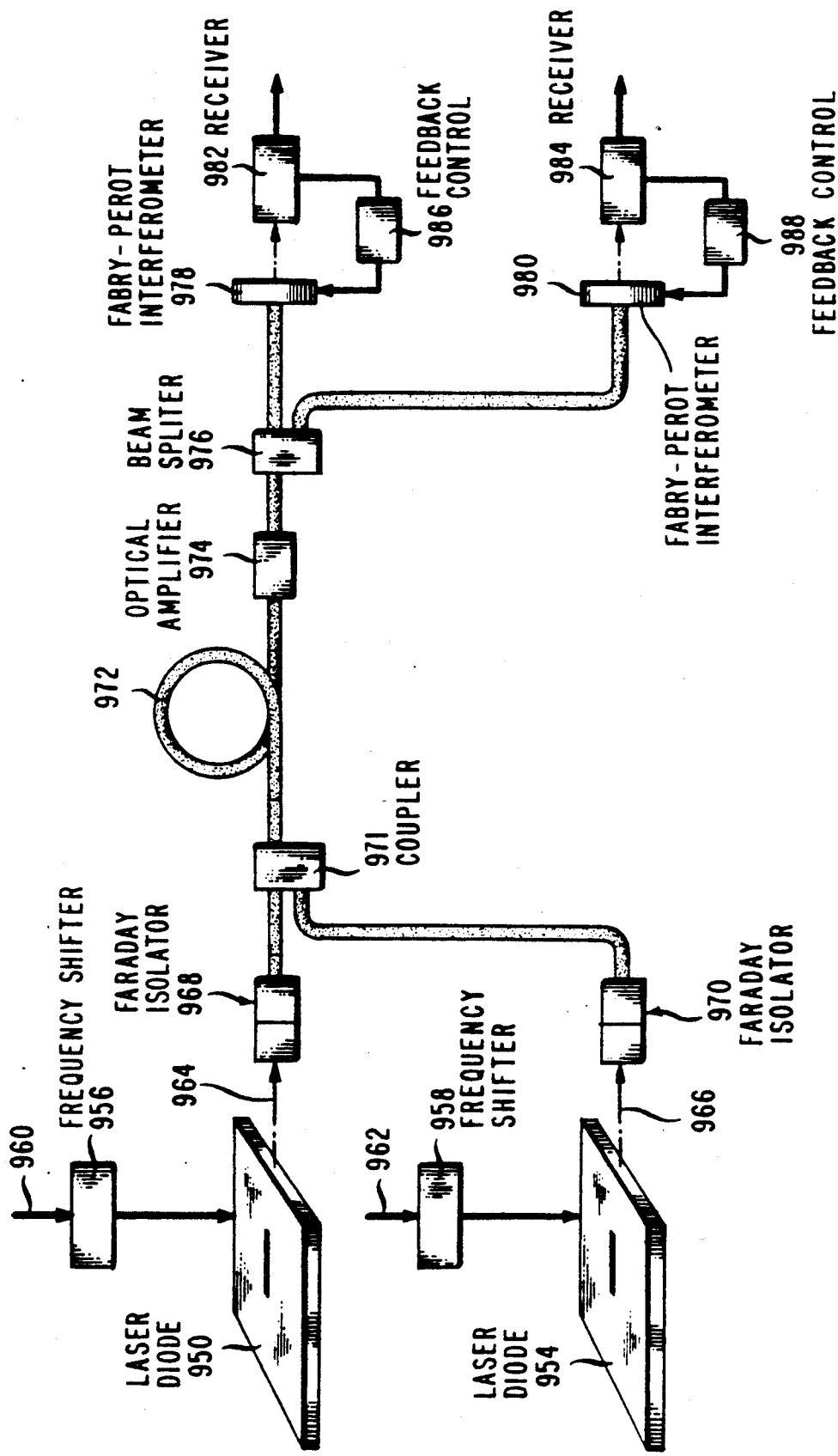

OPTICAL COMMUNICATION SYSTEMS USING FABRY-PEROT CAVITIES

CROSS-REFERENCE TO RELATED APPLICATION

This application is a continuation-in-part application of application Ser. No. 072,956, filed July 15, 1987 which is incorporated herein by reference.

BACKGROUND OF THE INVENTION

1. Field of the Invention

This invention involves Fabry-Perot cavities, and optical communication systems which include such cavities.

2. Description of the Prior Art

The economic advantages, envisioned years ago, of transmitting information in the form of optical signals have now been realized in commercial systems. Accordingly, designs for future optical communication systems go beyond the simple transmission of information on an optical carrier, and include the processing of signals while still in optical form. Current optical transmission systems must convert the optical signal to an electronic one before processing can take place. Such processing involves standard electronic devices. In the next generation of optical communication systems the optical signal itself often will be processed without conversion to an electronic signal. Such optical processing will require optical devices which are analogous to the electronic devices used for processing electronic signals, e.g., amplifiers, modulators, filters, etc. One aspect of this invention relates to a new type of Fabry Perot cavity which can be used to process optical signals and to a frequency shift key (FSK) modulation transmission system which uses a Fabry Perot cavity located at a receiver in combination with a laser such as a single electrode distributed feedback semiconductor laser diode.

The Fabry-Perot cavity was invented in the late 19th century. Its operation is well understood and discussed in most of the classic texts. See, for example, Born & Wolf, *Principles of Optics*, MacMillan, 1959, pages 378 et seq. An exemplary Fabry-Perot comprises a region bounded by two plane, parallel mirrors. The structure, as an entity, transmits only certain wavelengths, for which the cavity is said to be in "resonance"—a condition obtained by appropriately adjusting the cavity parameters. At resonance the cavity transmits a series of equally spaced wavelengths. The spacing between these wavelengths, called the "free spectral range" of the cavity (FSR), is a function of, among other parameters, the spacing between the mirrors.

The use of Fabry-Perot cavities to process optical signals, for example as filters, is well known. However, the application of such devices to the processing of optical signals in commercial communication systems has been hampered by, among other constraints, the lack of practical designs which had the proper characteristics, such as appropriate values of free spectral range. Nevertheless designs have been suggested that more closely meet the needs of a commercial system. For example, in *Electronics Letters*, Vol. 21, pp. 504–505 (May 12, 1985), J. Stone discussed a Fabry-Perot design in which the cavity was an optical fiber waveguide with mirrored ends. The free spectral range of the resulting cavity is determined by the length of the fiber segment, and accordingly different free spectral ranges can be obtained by using fibers of different lengths. The cavity can be "tuned" over one free spectral range by changing the cavity optical length by one-half the wavelength value of the light entering the cavity. In this way the cavity can be "tuned" to resonate at, and therefore transmit, light of different wavelength values. To obtain such tuning, the cavity length can be changed by means of an exemplary piezoelectric element attached to the fiber, which, when activated, will stretch the fiber and increase the associated cavity optical length accordingly.

Among the advantages of this "fiber Fabry-Perot" is the fact that the fiber is a waveguide. This eliminates deleterious diffraction effects present in long Fabry-Perot cavities which are not waveguides. The elimination of the deleterious diffraction effects is associated with the guiding characteristics of the fiber. However, the difficulty of working with small lengths of optical fiber precludes large values of free spectral range when using fiber Fabry-Perots, and consequently limits the usefulness of the fiber Fabry-Perot design.

Large free spectral ranges can be obtained using "gap" Fabry-Perots in which the cavity is a small gap. However, because of diffraction losses longer gap cavities are less practical, and therefore the gap Fabry-Perot is not adequate for applications which require the smaller free spectral ranges otherwise associated with larger gaps. Other techniques are known to minimize diffraction losses in large gap cavities, such as the use of expanded beams. However, those techniques involve other limitations which the practitioner may desire to avoid.

It is clear that while fiber Fabry-Perots can be used where short free spectral ranges are required, and gap Fabry-Perots can be used where large free spectral range Fabry-Perots are required, there is no effective design to answer the need for mid-range Fabry-Perots.

Another aspect of this invention relates to a frequency shift key (FSK) modulation transmission system which uses a single electrode distributed feedback semiconductor laser diode in combination with a Fabry-Perot cavity located at a receiver.

Optical communications systems are currently of commercial importance because of their ability to carry large amounts of information. Optical communication systems normally have a light source optically coupled to a photodetector via an optical fiber. Systems presently in use carry information at rates which are in excess of 100 Mbit/sec and, it is believed that future systems will carry information at very much higher rates.

For the higher transmission rates and greater distances between the light source and the photodetector, the light source currently preferred by those skilled in the art is a semiconductor laser diode. These diodes are relatively compact and can emit radiation with a relatively narrow spectral width in the wavelength regions presently of greatest interest. Diodes can now be fabricated having both single transverse and single longitudinal mode output. Such diodes are commonly referred to as single frequency lasers. These diodes are desirable in many applications because they, for example, maximize light coupled into the fiber and, at the same time, minimize the deleterious aspects of the fiber chromatic dispersion. Chromatic dispersion may broaden the light pulse which results in limiting the attainable bit rate and distance between the source and the photodetector. If either the bit rate or the distance between the source and the photodetector becomes too great, adjacent light pulses will overlap as a result of fiber dispersion and information will be lost. Normally, to avoid a loss of information due to dispersion, one or more regenerators will be inserted in the fiber between the source and the photodetector. The regenerator reconstructs the broadened, stretched-out light pulse into a more clearly defined light pulse.

Although a variety of modulation techniques are available, present systems normally use intensity modulation of the laser output to convey information. That is, information is conveyed by variation in the intensity of the light output from the laser. This system is normally referred to as Amplitude Shift Keying (ASK) System.

However, other modulation techniques offer specific advantages over intensity or amplitude shift keyed modulation. For example, higher transmission rates are possible with frequency modulation than are possible with intensity modulation for at least two reasons. First, the combination of the inherent frequency modulation or intensity modulation response with RC parasitics results in a more efficient high frequency response with frequency modulation than with intensity modulation. Second, the roll-off in response above resonance is slower for frequency modulation than for intensity modulation.

Moreover, direct intensity modulation of a semiconductor laser becomes increasingly difficult as the bit rate increases. Direct intensity modulation means that the intensity of the light output is varied by varying the current through the laser. This type of modulation has at least three problems which become significant at high bit rates. First, current modulation sufficient for intensity modulation causes large changes of the semiconductor laser diode wavelength which broadens the spectral width of the emitted radiation. This effect is commonly termed chirp and can be as large as, for example, five Angstroms. Chirp is often undesirable during intensity modulation because of the dispersive properties of the fiber. Second, intensity modulation of a laser requires a large amount of current, typically more than 60 mA which must be rapidly switched on and off. This switching becomes more difficult as the bit rate increases. Third, unless special precautions are taken, many single frequency lasers cannot be fully intensity modulated because of laser mode hopping—the laser output shifts from one longitudinal mode to another. This is commonly referred to as the "extinction ratio penalty".

Because of these reasons, alternatives to direct intensity modulation have been considered. One alternative commonly contemplated is the use of an external modulator positioned adjacent to the laser which might be, for example, an integrated optic modulator. The laser emits radiation continuously and the desired intensity modulation is supplied by signals to the modulator which vary light absorption within the modulator. Potentials normally greater than ten volts are often required for efficient operation of external modulators currently contemplated for use at high frequencies. The voltages required generally increase as the frequency increases. Additionally, there is the problem of obtaining simple, efficient, high speed modulators. There is also the additional problem of signal loss which results from the coupling between the laser and modulator as well as between the modulator and the optical fiber.

Another approach uses coherent optical techniques which require frequency locking two oscillators separated by an intermediate frequency (IF). While high sensitivity is obtained, locking the oscillators together can be difficult as they may be at diverse locations which can be as far as 100 km apart. In addition, processing of the IF signal adds complexity to the receiver.

BRIEF DESCRIPTION OF THE INVENTION

One aspect of the invention is a Fabry-Perot cavity which comprises in part a waveguiding portion and in part a nonwaveguiding portion. In this manner, a cavity is constructed whose length would be too short to manipulate effectively if it were comprised exclusively of a waveguiding portion, and whose length might have unacceptable diffraction losses if it were comprised exclusively of a nonwaveguiding portion. In the inventive device the resonant wavelength can be adjusted by varying the length of either the gap or the waveguide or both. The device can be advantageously constructed and aligned using fiber coupling technology.

In another aspect of the invention, a light source comprising a source of radiation such as a single-electrode distributed feedback semiconductor laser diode is frequency modulated by direct current modulation with no pre-equalization or pre-distortion of the signal, and the optical signal is coupled to and carried by an optical fiber to a remote location. At the remote location, an optical discriminator such as a fiber Fabry-Perot interferometer can be used for both channel selection where more than one channel is being carried by the optical fiber and for converting the frequency modulated signal of each channel to an amplitude modulated signal. The amplitude modulated signal can be detected by a direct detection receiver. In those instances where signal enhancement is required, such as in long-haul lightwave transmission systems, an optical amplifier can be substituted for the normally mandatory regenerator located at the repeater stations. In those instances where several frequency modulated channels are wavelength division multiplexed onto a single fiber path, a single optical amplifier can be used to replace all the regenerators at a repeater station.

DETAILED DESCRIPTION

The inventive Fabry-Perot cavity addresses specific needs of advanced optical communications systems. In such advanced systems, the optical signal will often be processed while in optical form, without transforming it to electronic form. Among the devices needed for such processing of signals in optical form are optical filters, optical demodulators, etc.

An appropriately adjusted Fabry-Perot cavity could operate to process such signals. However, new embodiments are needed which would satisfy the design requirements for such devices. So, for example, without further engineering developments the free spectral range necessary for certain applications requires cavities of a length which are too short for realization in purely fiber form, and too long for realization in purely gap form.

Figure 1:
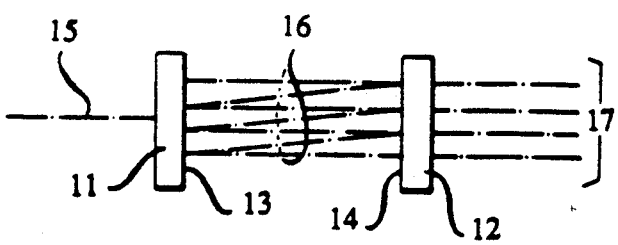
FIG. 1 is a schematic representation of a prior art Fabry-Perot cavity.
Figure 2:
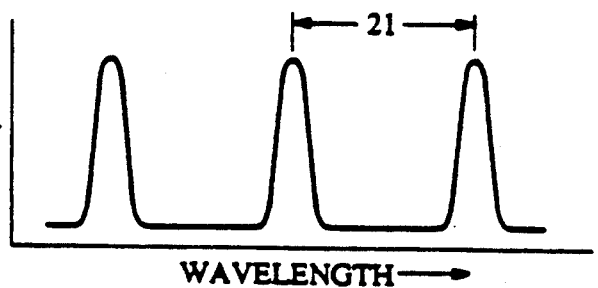
FIG. 2 is a schematic representation of the transmission characteristics of an exemplary Fabry-Perot cavity.

The resonant characteristics of a Fabry-Perot cavity, which must be understood to appreciate the present invention, are more easily described in the context of FIGS. 1 and 2. (For the purpose of this discussion the term optical, as used in "optical wavelength" or "optical communications systems" refers to electromagnetic radiation of wavelength value such that the radiation can be transmitted by means of dielectric fibers with loss less than 25 db/Km. Such wavelengths are currently in the range of from 4000∠ to 20,000∠. However, as new fiber materials and designs are developed the "optical" range can expand further into the infrared and ultraviolet. In any event, the "optical" range as used here does not necessarily coincide with the "visible" portion of the spectrum.)

In FIG. 1, 11 and 12 are exemplary plane, parallel materials which transmit optical wavelengths. The inner surfaces of 11 and 12, identified as 13 and 14, at least partially reflect optical wavelengths. Light 15 entering the cavity defined by the mirrors partially reflects back and forth between the two mirrors 13 and 14. This is shown schematically in the Figure by the rays 16. The transmitted beam 17 may be viewed as consisting of various rays, each associated with a different reflection at the mirror 14. These transmitted rays interfere with each other, either constructively or destructively depending upon the phase of the various rays at the mirror surface.

When the spacing between the mirrors, and the other cavity parameters, are adjusted so that the transmitted light rays interfere constructively, the cavity is said to be in "resonance", and light of appropriate wavelength is transmitted as shown by 17. For such wavelengths the cavity acts as a filter, as shown in FIG. 2.

The distance between cavity transmission wavelengths, shown in FIG. 2 as 21, is called the "free spectral range" (FSR) of the cavity and is given in frequency units by $$\text{Free spectral range } (FSR) = \frac{C}{2nL_c} \qquad (1)$$

Here, C is the speed of light, n is the index of refraction of the medium within the cavity, and $L_c$ is the length of the cavity, i.e., the distance between the two mirrors. Although FIG. 2 shows an apparent absence of transmission in the region between the transmission peaks, there is in fact some non-zero transmission in those regions for real Fabry-Perots. Such non-zero transmission between the transmission peaks of the Fabry-Perots will result in "cross-talk" when the devices are used in wavelength multiplexed optical communication systems. In such systems, numerous "channels" of different wavelengths are transmitted, one for each subscriber line. The lack of discrimination, associated with the non-zero transmission between the resonant peaks, results in the deleterious cross-talk and is a limitation that must be considered in system development. See for example, Marcuse and Stone, *Journal of Lightwave Technology*, Vol. LT-4, No. 4, April 1986, pp. 377 et seq.

The bandwidth of the transmission peaks shown in FIG. 2, i.e., the width of the transmission peak at half maximum, is a function of the reflectivity of the mirrors and is given by $$\text{Bandwidth} = \frac{FSR}{f} \qquad (2)$$

where f is the finesse of the cavity, given by $$f = \pi \frac{\sqrt{R}}{1 - R} \qquad (3)$$

where R is the reflectivity of the mirrored surfaces. It should be noted that the simple finesse discussed here represents only those contributions due to the inherent characteristics of the mirrors themselves. A more complete analysis shows that in addition to this "mirror" finesse there are contributions due to, for example, diffraction effects, alignment effects, and surface effects. All of these contributions, which represent actual loss mechanisms, result in lowered finesse and lowered throughput. See, for example, Marcuse and Stone, op. cit. These contributions would therefore have to be considered in specific design development.

Design difficulties associated with diffraction losses, as well as practical limitations associated with the use of macroscopic mirrors such as those shown in FIG. 1, may be alleviated through the use of a design discussed, for example, by J. Stone in *Electronics Letters*, Vol. 21, No. 11, pp. 504–505, published on May 23, 1985. In that publication, Stone shows that the Fabry-Perot cavity can be an optical fiber with mirrored fiber ends. Since the fiber is a waveguide, and "confines" light of appropriate modal content entering the waveguide, diffraction effects are eliminated. The free spectral range of the cavity can be selected, depending upon the contemplated system applications, by choosing a fiber of appropriate length. The resonant characteristics of the cavity can be tuned over a free spectral range by "stretching" the fiber length using, for example, an attached piezoelectric element.

Design criteria for bandwidth and finesse may be understood by considering that in wavelength multiplexed systems, especially for those to be used in local area networks, a desired bandwidth ranges from several hundred megahertz to the gigahertz range, with a capacity to transmit hundreds of channels. Allowing for a factor of five spacing between the various channels dictates a working free spectral range of approximately one hundred gigahertz. This mandates cavities of length in the millimeter range. A system with higher finesse will minimize the amount of transmission which occurs between transmission peaks, and therefore minimizes cross-talk. However, lower finesse will limit insertion loss.

It is clear from Equation 1 that if large free spectral ranges are needed, short length cavities must be used. However, from a simple physical design viewpoint, it is extremely difficult to "stretch" small lengths of fiber, and therefore such short cavities, if they are fiber cavities, cannot be effectively "tuned". This tuning difficulty is due not only to difficulties associated with the physical size of such a short length of fiber, but is also associated with the difficulty of obtaining, for example, a short piece of piezoelectric material whose length can be varied by as much as one-half an optical wavelength. Such a material, appropriately connected to the fiber, is necessary in certain embodiments to obtain the required tuning. Consequently, for applications in which short Fabry-Perots are necessary, "gap" cavities such as that shown in FIG. 1 may be used. There is, however, a mid-range of applications, involving cavities on the order of 5 mm long, for which a gap cavity could involve unacceptably high diffraction losses, but for which a fiber cavity would still be too short to be easily tunable.

Figure 3:
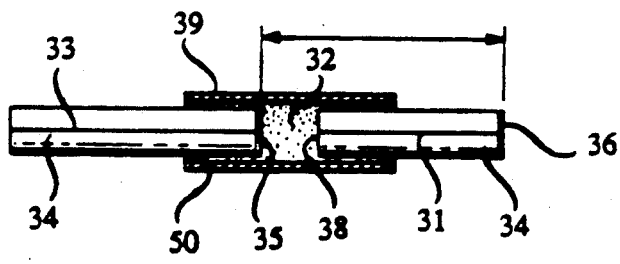
FIGS. 3 and 4 are schematic representations of the inventive Fabry-Perot cavity.
Figure 4:
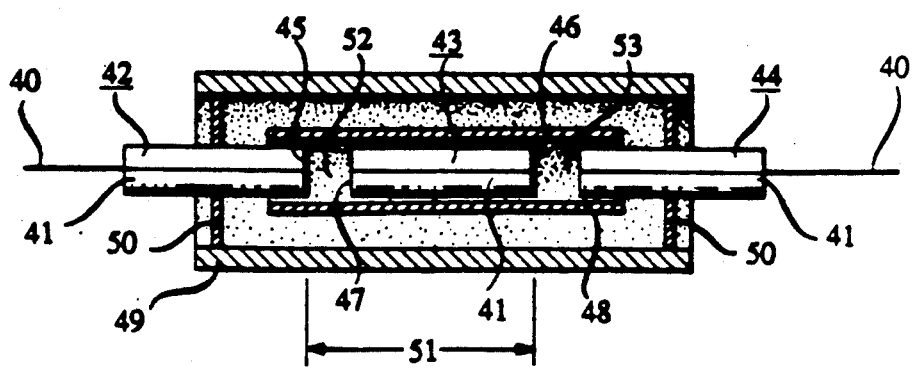

FIGS. 3 and 4 are embodiments of the invention which solves the need for such mid-range cavities. In the simple schematic embodiment of FIG. 3, a fiber "waveguide" 31 and a gap 32 are combined to form a Fabry-Perot cavity bounded by surfaces 35 and 36. The defining characteristics of a waveguide are well known in the field and are described in all of the classical texts. See, for example, John David Jackson, *Classical Electrodynamics*, John Wiley & Sons, 1962. To properly define the characteristics of a waveguide, one must analyze the appropriate solutions to Maxwell's equations. However, in general, a waveguide is a structure in which the field configurations will not change in at least one dimension. Accordingly, in the embodiment of FIGS. 3 and 4, the field configurations descriptive of the waveguide modes are constant along the longitudinal direction of symmetry.

The reflective surfaces, characteristic of Fabry-Perots, are represented in FIG. 3 by 35 and 36. Accordingly, an exemplary cavity length of from 1 to 10 mm or 2 to 7 mm is given by 37. The surface 38 will preferably include an antireflective coating so as to uniquely define the cavity limits at the reflecting surfaces 35 and 36. Without the antireflection coating, reflections that may occur at surface 38 will result in a second weaker Fabry-Perot defined by the bounding surfaces 36 and 38, thereby resulting in a cavity within a cavity, reducing the effectiveness of either of the cavities. However, the use of the antireflecting coating on 38 permits the clear definition of a single cavity bounded by the surfaces 35 and 36. Such an antireflective coating may be used similarly in the device shown in FIG. 4 at surface 47.

In FIG. 3, the element 39 is a schematic representation of means for varying the optical length of the cavity in order to vary its resonant characteristics, and therefore the value of the wavelengths which are transmitted by the cavity. The optical length of the cavity is defined as the product of the index of refraction and the physical length of the cavity, and accordingly the optical length may be varied by either altering the physical length of the cavity or by altering the dielectric characteristics of the medium within the cavity. Clearly, combinations of both may also be used. Specific embodiments of element 39 may include piezoelectric elements, thermal elements, or other appropriate elements, which alter the optical length of either the gap or the waveguide or both by changing either the index of refraction of the medium or the physical length of the medium or both. The element 39 may be attached to the fibers 31 and 33, as shown in FIG. 3, by enclosing the fibers in, for example, ferrules 34 borrowed from the fiber connector technology and attaching the element 39 to the ferrule 34 by means of an appropriate adhesive 50. Although the embodiment of FIG. 3 shows element 36 as a cylindrical shell, it is clear that the element need not have that specific physical configuration and may be configured in any way that permits effective practice of the invention. Likewise, in FIG. 4 the similar element 49 need not be cylindrical in shape. In broader context, the shapes of any of the elements shown in the specific embodiments of the Figures may be varied in a manner consistent with effective practice of the invention.

One aspect of the invention which is illustrated in FIG. 3 should be carefully noted. That aspect involves the relative lengths of element 39, used to vary the cavity length, and the length of the cavity 37 itself. It should be noted that in prior art cavities the size of element 39, especially when parallel to the axis of symmetry of the cavity, was no larger than the cavity itself. For smaller cavities this is a critical limitation since the change in length which can be effected by element 39 is only a fraction of the length of element 39. However, if the cavity is small and the element 39 is equal to the size of the cavity, then the amount of change that can be effected by the element 39 will be relatively small. But, the change that must be effected in the cavity length is one-half the wavelength of the light entering the cavity—an absolute number independent of the cavity length. If the cavity is small, and the element 39 is likewise small, then the amount of change that can be effected by the element 39 may be less than the necessary half wavelength. New structures which permit relatively large changes in dimensions of element 39 may permit effective use of such elements even though they are as short as the cavity length. However, this problem may also be solved, as shown in FIG. 3, by using an element 39 which is longer than the cavity itself.

In practical embodiments of the invention alignment of the various cavity elements becomes critical. Poor alignment results in the very least in decrease values of finesse and increased insertion loss. Additionally, connection of the cavity to other elements of the optical system must also be considered. Applicant has solved these problems by using fiber connector technology. A critical characteristic of such connectors is their ability to establish and maintain alignment to very high tolerances. Accordingly, in FIG. 4, the inventive cavity is shown using appropriate fiber connectors to align the cavity elements, and to connect the cavity to other fiber elements of the optical communication system.

In FIG. 4, 40 is an optical fiber, which in this exemplary embodiment may be part of a larger optical communication system. The fiber 40 is connected to the embodiment of the invention which is shown in the Figure. In the embodiment the cavity comprises region 51, which is bounded by reflecting surfaces 45 and 46. As shown in the Figure the cavity comprises, in part, a waveguide 43, and, in part, a nonwaveguiding gap 52.

In order to properly align the fiber and cavity elements, the fiber is enclosed in appropriate glass or ceramic ferrules 41 borrowed, for example, from fiber connector technology. These ferrules provide a surface for connection of the piezoelectric element, but, more importantly, provide a simple means for aligning the various elements of the system including 42, 43 and 44. Additionally, the ferrules 41 may provide a means for connecting the cavity to the remainder of the optical communication system, using the established fiber connector technology.

Small changes in the size of the cavity may be effected by means of the exemplary piezoelectric element 49, which is attached to the fiber, using the exemplary ferrules 41 and epoxy adhesives 50. The center and right hand fiber elements, 43 and 44, may be placed in the sleeve rigidly with little opportunity for motion, while the left hand element may be placed with greater opportunity for motion so that activation of the piezoelectric device results in an increase in the size of the gap 52 and therefore an increase in the optical length of the cavity. The gap 53 is not part of the optical cavity and may be set to optimize operation. It should be noted that in accordance with an aspect of this invention, the piezoelectric element is longer in extent than the cavity itself.

The inventive cavity can be made using standard production single mode fiber. If multimode fiber is used, the cavity will have resonances associated with each of the modes that can be supported by the fiber, thereby destroying selective transmission characteristics of the Fabry-Perot cavity. Fiber ends may be prepared by epoxying the fiber in precision-bore, snug-fitting capillary tubes used in rotary splice connectors, see C. M. Miller et al, *Optical Fiber Communications*, Feb. 11–13, 1985. In these tubes the bore axis is extremely well aligned with the outer surface of the tube. The tubes are placed in a well-aligned chuck and the ends are polished. Mirrors are then deposited on the ends using, for example, E-beam evaporating system. Eight alternating ¼ wavelength layers of Si and $SiO_2$ may be deposited. The measured transmission of a similarly-coated microscope slide is 1.5–2%. A piezoelectric rod, 49, is epoxied onto the tubes to provide the tuning. Rotary splice connections may be made to the fiber Fabry-Perot tubes. The splice connection may be made from tubes matched to those on the fiber ends so that low coupling loss could be obtained by butting the tubes together with a predetermined orientation. An exemplary length for element 43, is 4.00 mm. The gap 52, as shown in FIG. 4, is approximately 2 microns long and accordingly the total cavity length is approximately 4.00 mm, resulting in a tuning range $\Delta f$ of 25.00 GHz.

Figure 5:
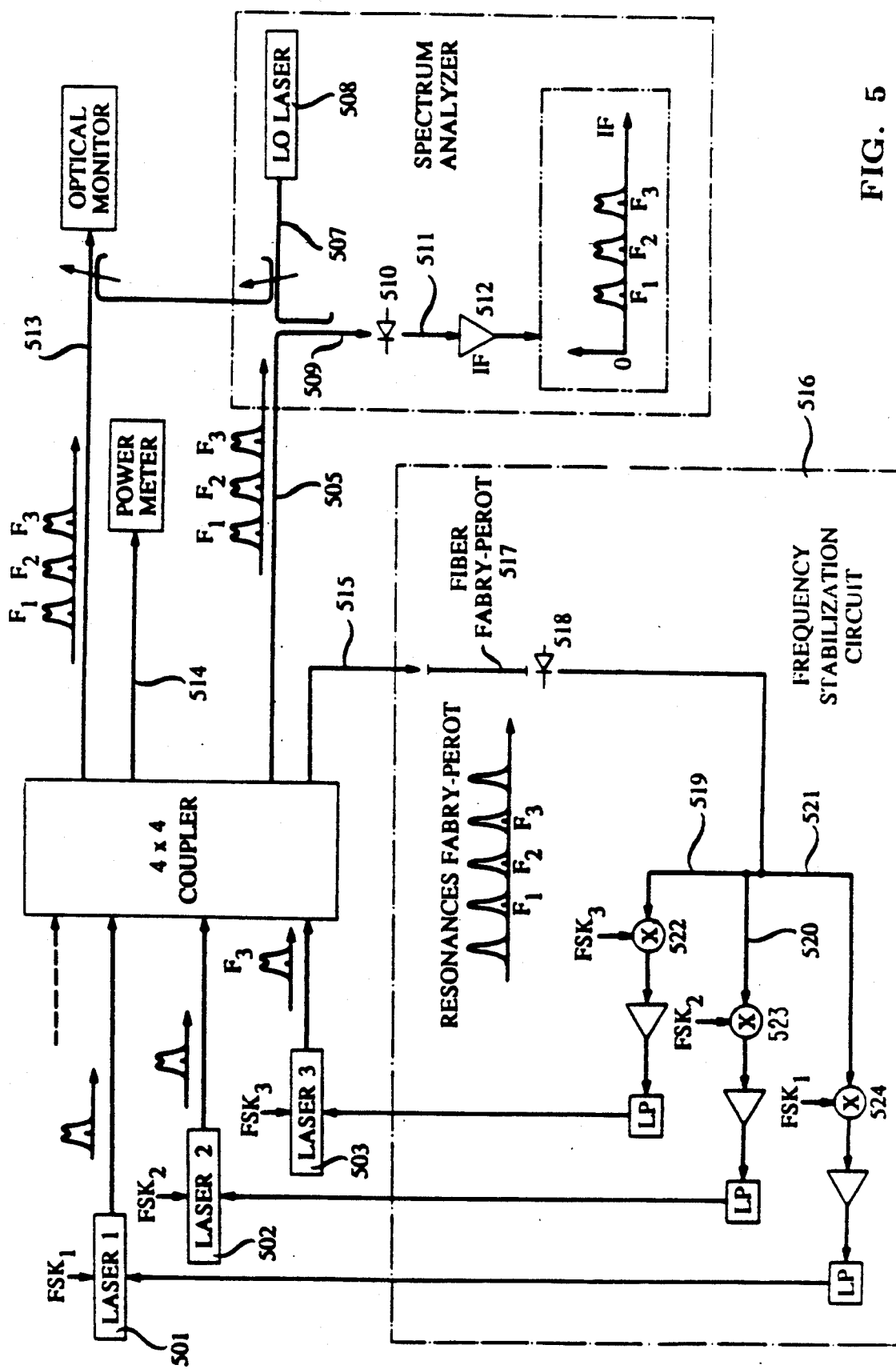
FIG. 5 is a schematic representation of an exemplary optical communications system, using the inventive Fabry-Perot cavity.

FIG. 5 is a specific embodiment of the invention used as part of an optical communication system. This embodiment is similar to the disclosure of Bernard Glance, filed in the U.S. Patent and Trademark Office on June 9, 1987, Ser. No. 059,973, with the critical distinction that the inventive fiber Fabry-Perot disclosed in this application is used.

The embodiment of FIG. 5 involves the stabilization of a comb of intelligence bearing frequency multiplexed signal frequencies, using the resonances of the inventive Fabry-Perot cavity. The multiplexed signal will have been modulated at a frequency which may be representative of intelligence and which is referred to a "dithering" frequency. The stabilization is effected through the use of at least two appropriate feedback loops. Separate error signals associated with the drifts of at least two signals which have been multiplexed and transmitted through the inventive Fabry-Perot are independently generated by mixing the dithering component of the multiplexed signals with a corresponding dithering frequencies. An optical network using frequency division multiplexing (FDM) and heterodyne detection techniques can provide the capability of interconnecting a very large number of subscribers. However, such a system requires that the frequency interval between the optical carriers be controlled in order to avoid collision between the optical signals. In a radio system, this problem is solved by assigning a fixed frequency to each carrier controlled by a highly stabile frequency source. Such an approach will be very difficult and expensive to implement in an optical FDM communication system, especially if the frequencies of the optical sources must be spaced at small frequency intervals.

The inventive fiber Fabry-Perot resonator, when tunable, may be used at each subscriber location providing a comb of equally-spaced resonances from which the subscriber selects one resonance to frequency-lock his optical source. The set of resonances is made the same for all the subscribers by frequency-locking all the Fabry-Perot resonators to an optical signal received from a central location. In the following, a variant of this scheme is discussed in which all the optical sources are frequency-locked to the resonances of a single Fabry-Perot resonator. This frequency stabilization scheme provides a simple solution to the frequency confining problem of FDM optical signals originating from the same location. The optical portion of the implementation may use the inventive Fabry-Perot resonator, and a photodector. The remaining signal processing may be done electronically.

Circuit Description

An exemplary circuit for the practice of this embodiment of the invention is shown in FIG. 5. The three optical sources, 501, 502 and 503, are fast frequency-tunable external cavity lasers providing a single-frequency signal around 1.28 $\mu$m that can be frequency-tuned over several thousands of GHz as well as frequency-modulated up to 100 Mb/s. See, for example, B. Glance et al, *Electronics Letters*, Vol. 22, No. 3, pp. 98–99, January 1987. The optical sources are tuned to different frequencies, spaced by a frequency interval that can be varied from zero MHz to several tens of GHz. As shown in the figure, each laser is Frequency Shift Keyed (FSK) at 45 Mb/s by an independent random NRZ bit stream. The modulation index is equal to about one. The three optical signals are multiplexed by a 4×4 optical coupler, 504. Each of the four output fibers of the coupler carries the three FDM signals. For analysis, the multiplexed signal from one of the fibers 505 may be transposed from the optical domain to the IF domain. The multiplexed signal on 505 is combined at 509 with the optical signal 507 from a tunable external-cavity laser 508. See, for example, R. Wyatt et al, *Electronics Letters*, Vol. 19, No. 3, pp. 110–112, February 1983. The resulting signal is detected by a photodiode 510 yielding an IF signal 511 which can be observed with an IF spectrum analyzer 512. Two other output fibers 513 and 515 are used, respectively, to monitor the optical signals and to transmit the frequency shift keyed signal to a frequency stabilization circuit 516 at a remote location to demodulate the frequency shift keyed signal which appears on 519 to an amplitude shift keyed signal and to measure the transmitted signal power.

The inventive Fabry-Perot resonator is designed to provide a comb of resonances equally-spaced by 500 MHz with a 3 dB bandwidth of about 50 MHz. One end of the regular section of fiber is connected to one of the outputs 515 of the 4×4 optical coupler; the other end illuminates a photodetector 518.

The error signal needed to frequency-lock the optical sources is generated as follows: As an optical source drifts from the peak of a Fabry-Perot resonance, the photodiode detects a baseband signal having the same pattern as the FSK bit stream modulating the optical source. However, the polarity of the detected pattern relative to that used to FSK the laser depends on which side of the resonance the frequency drift occurred. Thus, an error signal can be obtained by multiplying the FSK bit stream by the detected signal and filtering the resulting amplified product by a low-pass filter. See, for example, R. V. Pound, *Radiation Laboratory Series* 16 pp. 342-343, McGraw-Hill, N.Y., 1948. The error signal is then used to lock the laser frequency to the selected Fabry-Perot resonance.

Thus, the signal on fiber 515 is a frequency shift keyed (FSK) signal which is demodulated to an amplitude shift keyed (ASK) signal by the fiber Fabry-Perot cavity or interferometer and detected by photodetector 518.

In the present case, three independent error signals are obtained from the same photodiode current. This is achieved by dividing the photodiode signal into three parts 519, 520 and 521, each feeding a balanced-mixer 522, 523 and 524, respectively. The second input of this device is fed by one of the three different FSK modulating signals as shown (FSK$_1$, FSK$_2$ and FSK$_3$). Therefore, each balanced mixer acts as a correlator, comparing a given FSK modulating signal to the presence of a similar pattern detected by the photodiode. As a result, each balanced mixer yields an error signal depending only on the frequency drift of one laser. The three lasers can thus be frequency-locked, independently, to any of the resonances of the Fabry-Perot resonator.

The above frequency stabilization circuit can be generalized to an FDM system having a large number of optical sources, all of which are frequency-stabilized to the resonances of a single Fabry-Perot resonator.

Figure 6:
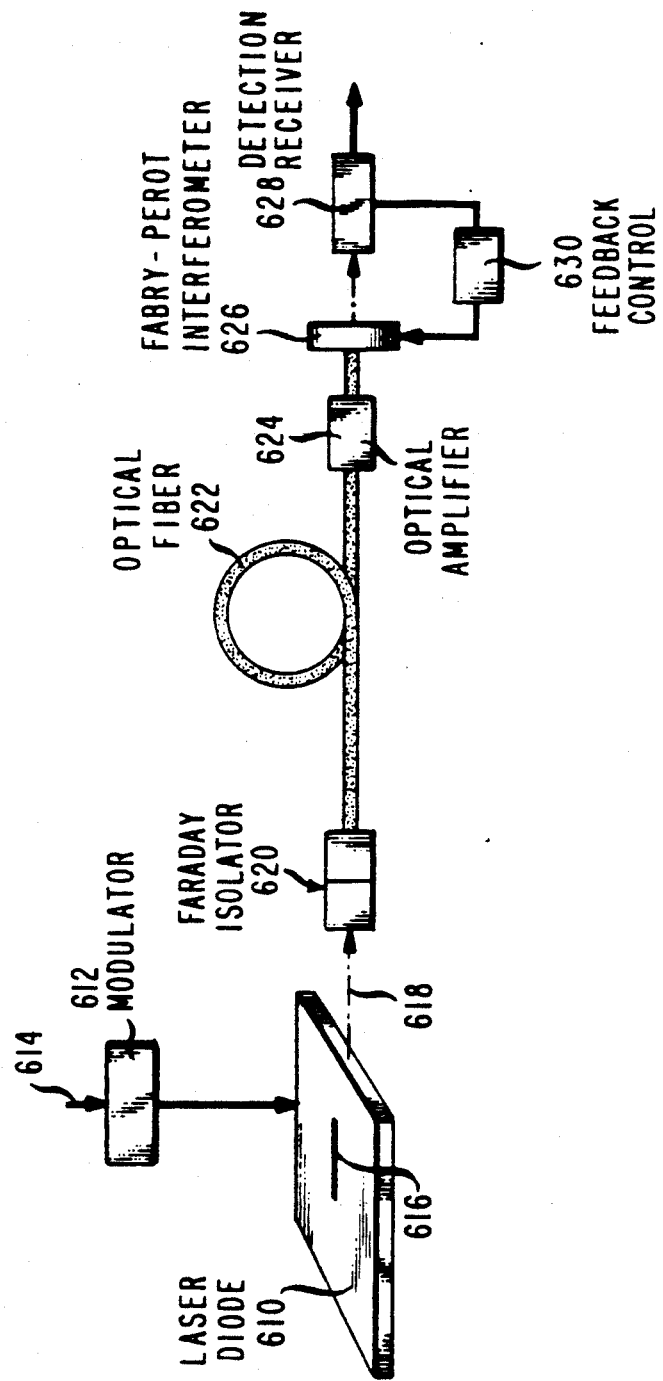
FIG. 6 is a schematic representation of a frequency modulated system in accordance with the principles of the invention.

Another embodiment of a frequency-shift keyed modulated light transmission system, in accordance with the principles of this invention, is schematically depicted in FIG. 6. FIG. 6 illustrates the optical transmission system of FIG. 5 which results when a single unstabilized laser is coupled to transmit an FSK signal along the optical fiber 515 to a remote location where the received FSK signal is demodulated to an ASK signal by the fiber Fabry-Perot interferometer 517, and the ASK output of the fiber Fabry-Perot interferometer is detected by an optical detector 518. Obviously, for a single laser, the 4×4 optical coupler is not required. Referring to FIG. 6, the light source comprises a semiconductor laser diode 610 and means 612 for shifting the frequency of said diode in accordance with information received on line 614. One realization of means 612 is modulation of the injection current to the laser. The modulation current is varied to obtain the desired frequency shift. The laser diode has an active region 616 in which electrons and holes recombine radiactively. The frequency modulated beam from the laser is indicated as 618 and is incident upon and passes through two Faraday isolators 620 which provide over 60 dB optical isolation. The optical signal then passes through an optical fiber transmission path 622, an optical amplifier 624, if required, and an optical discriminator which may be selectively variable such as a Fabry-Perot interferometer 626. A direct detection receiver 628 is coupled to receive and detect the optical signal which passes through the Fabry-Perot interferometer. The Fabry-Perot interferometer can be frequency-locked to the frequency of logic "1" of the frequency shift keyed signal by means of a feedback control 630 coupled between the Fabry-Perot interferometer and the direct detection receiver 628 to maximize receiver photocurrent.

The laser is a single-electrode distributed feedback laser diode which, when in its active state, generates a single longitudinal mode. In operation, the laser is biased well above threshold and the current drive to the laser to shift the frequency to effect Frequency-Shift Keyed modulation is typically much smaller than that which is required for Amplitude-Shift Keying modulation which drives the laser from a high bias level down to or near threshold. The reduction in drive requirements for FSK modulation is very significant at very high bit rates because high-speed, high-power laser driver circuits are difficult to fabricate. In addition, the small drive required for FSK modulation provides a relatively compact laser spectrum which helps to minimize the problems of fiber chromatic dispersion and makes efficient use of the frequency spectrum for Wavelength Division Multiplexing (WDM).

Typically, FSK modulation signals used in heterodyne configurations are electronically demodulated. However, FSK modulation signals can also be optically demodulated by converting the signals to baseband ASK signals and then using a conventional direct-detection receiver. This is an advantage because, with a coherent system, heterodyne detection of high bit rate signals require large intermediate frequencies and associated wideband electronics.

In operation, a single-electrode Distributed Feedback (DFB) laser diode was frequency modulated by direct current modulation with no pre-equalization at bit rates of 2 Gb/s, 4 Gb/s and 8 Gb/s. The data were optically demodulated at the receiver using Fabry-Perot interferometers. The insertion loss of the Fabry-Perot interferometers used was less than 0.25 dB.

Semiconductor injection lasers normally have a non-uniform frequency modulation response which is caused by competition between thermal modulation and carrier modulation effects. Non-uniform frequency modulation response is not desirable because it results in pattern dependent errors. It is common to compensate for non-uniform frequency modulation response by using a passive network to pre-equalize the modulation signal. Unfortunately, this solution usually results in relatively small frequency modulation response—on the order of 100 MHz/mA—and, therefore, increased drive requirements. Multiple electrode lasers typically have a flat frequency modulation response which is normally less than 1 GHz and, therefore, are not practical for very high data rates.

In this invention, the above noted problems are avoided by using a laser that has a relatively large linewidth enhancement factor $\alpha$ (alpha). Lasers having a large linewidth enhancement factor have large linewidth power products, some as high as 500 MHz.mW. Large $\alpha$ results in large carrier-mediated frequency modulation responses, for example, up to 2 GHz/mA. A large frequency modulation response provides a double benefit. One benefit is that the drive requirements are small. The other benefit is that the frequency modulation response remains substantially flat to very low frequencies. One such laser diode is a single-electrode distributed feedback laser diode.

Figure 7:
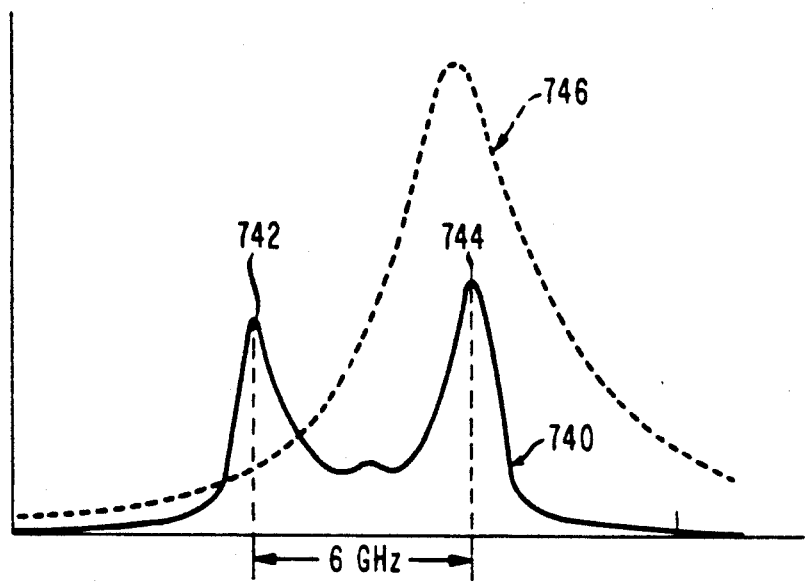
FIG. 7 illustrates a plot of the spectrum of the output signal of a frequency modulated semiconductor laser superimposed on the plot of the transmission spectrum of a Fabry-Perot interferometer used to demodulate the signal.

Referring to FIG. 7, there is illustrated, as spectrum curve 740, an example of the optical spectrum of a signal Frequency Shift Keyed at a data rate of 2 Gb/s using $2^{23}-1$ pseudorandam word lengths. The resultant spectrum 740 consists of two peaks 742 and 744. The first peak 742 can be assigned to represent a logic "zero", and the second peak can be assigned to represent a logic "one". The peak-to-peak current drive required was approximately 4 mA and resulted in only about 7% amplitude Modulation.

Superimposed on the Frequency modulation spectrum curve 740 is the transmission response 746 (95% peak transmission) of a 650 um-long Fabry-Perot interferometer with a mirror spacing of 650 um which is used to demodulate the signal. The bandpass of the Fabry-Perot interferometer or cavity is approximately 7 GHz FWHM. The bandpass of the Fabry-Perot interferometer, as represented by the transmission response curve 740, will pass the second frequency content 744 and block the first frequency content 742. Thus, the Fabry-Perot interferometer converts the FSK signal to an ASK signal by passing all signals which are representative of a "one" and blocking all signals which are representative of a "zero". It is to be noted that the method of converting the received FSK signal to an ASK signal by the Fabry-Perot interferometer disclosed in the structure of FIG. 5 varies slightly from that disclosed in FIG. 6.

More specifically, in the embodiment of FIG. 5, the variation of the frequency between the "ones" and the "zeros" of the FSK signal is relatively small. Conversion to an ASK signal is obtained by moving the FSK signal up and down the side of a discriminator curve. In the embodiment of FIG. 6, the deviation of the frequency between the "ones" and "zeros" of the FSK signal is sufficiently wide to provide two individual peaks. Conversion to an ASK signal is obtained by passing the peaks which represent the "ones" and blocking the peaks which represent the "zeros". By small deviation, it is meant that the deviation of the frequency, the differential of frequency between the "ones" and the "zeros" ($f_d$) divided by the modulation frequency or bit rate (B) is normally small; on the order of unity. The deviation is considered to be wide when the relationship $$f_d/B$$

is equal to or greater than one. To optimize the number of channels (N) in a frequency division multiplexed system, the relationship $$f_d/B$$

should be approximately 3.2. A direct detection receiver coupled to detect the optical signal passed by the Fabry-Perot interferometer can generate clearly distinguishable "zeros" and "ones".

In *Electronics Letters*, Vol. 21, pp. 504–505 (discussed previously). J. Stone discussed a Fabry-Perot design in which the cavity was an optical fiber waveguide with mirrored ends. The free spectral range of the resulting cavity is determined by the length of the fiber segment, and accordingly different free spectral ranges can be obtained by using fibers of different lengths. The cavity can be "tuned" over one free spectral range by changing the cavity optical length by one-half of the wavelength value of the light entering the cavity. In this way the cavity can be "tuned" to resonate at, and therefore transmit, light of different wavelength values. To obtain such tuning, the cavity length can be changed by means of an exemplary piezoelectric element attached to the fiber, which, when activated, will stretch the fiber and increase the associated cavity optical length accordingly.

Figure 8:
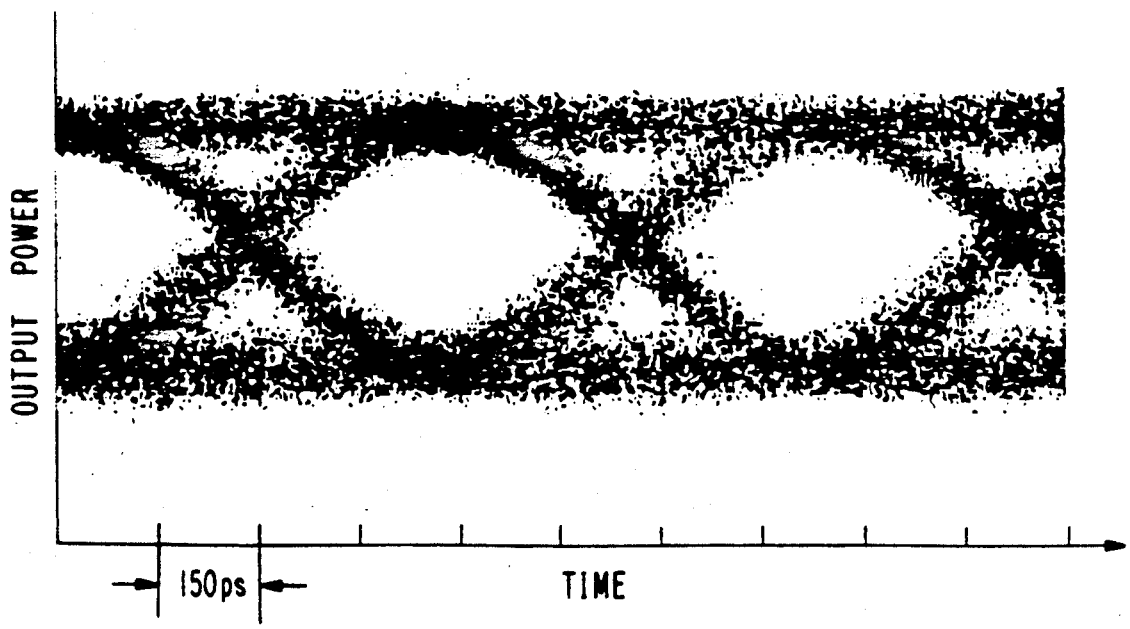
FIG. 8 is a plot of the eye diagram of the demodulated signal.

Referring to FIG. 8, there is illustrated an oscilloscope trace of the resultant eye diagram of the demodulated signal. The horizontal axis corresponds to time at 150 picoseconds/div. The vertical axis corresponds to the output power incident on the direct detection receiver. An examination of the curves of FIG. 8 will reveal that no degradation due to non-uniform Frequency Modulation response at low frequencies is evident.

Figure 9:
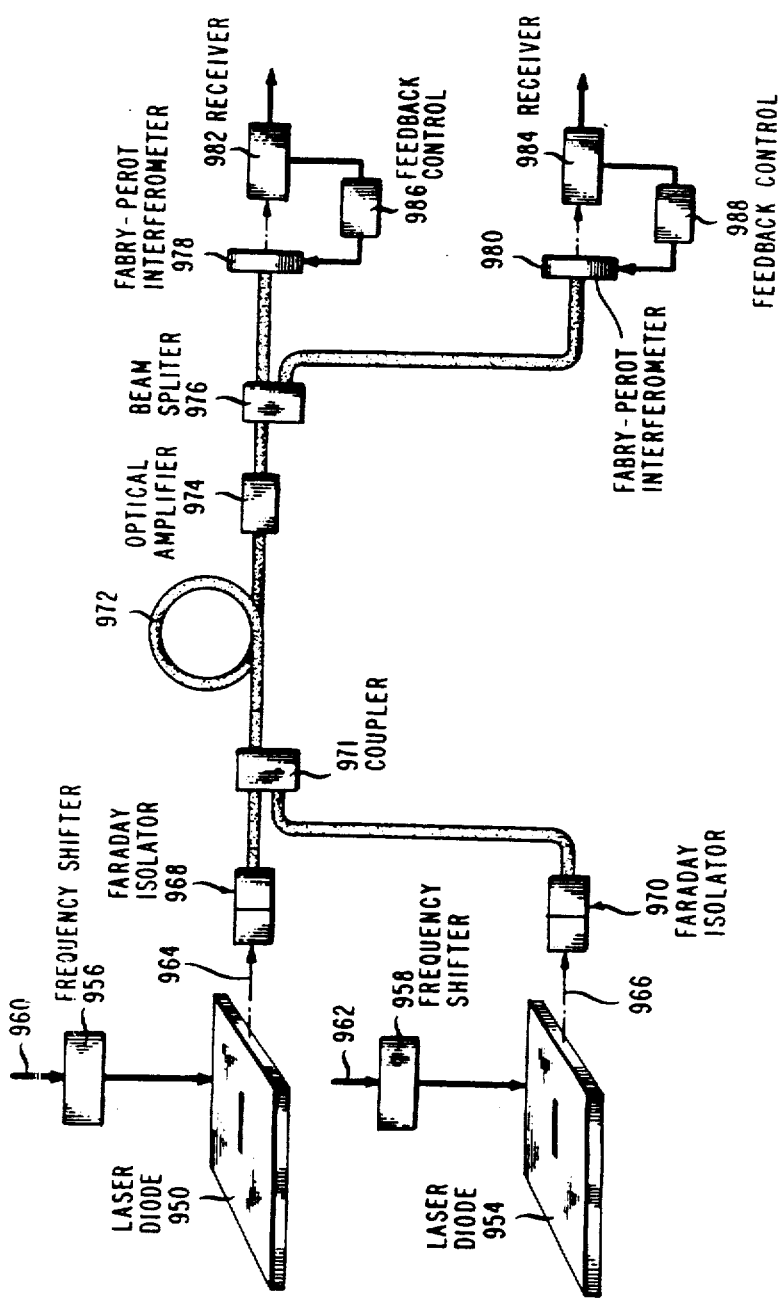
FIG. 9 is a schematic representation of a multiple channel WDM system in accordance with the principle of the invention.

Referring to FIG. 9, there is illustrated an expansion of the system of FIG. 4 illustrating two separate channels. In this system, an optical coupler (i.e. optical star network, a frequency selective coupler, or the like) can be included to enable the two laser diodes to transmit over a common optical fiber.

The light sources comprise two laser diodes, 950, 954, each operating at a distinct frequency, and means 956, 958 for shifting the frequency of the associated diode in accordance with information received on lines 960, 962. Means 956, 958 includes both the bias and modulator currents. The modulation current is varied to obtain the desired frequency shift. The frequency modulated beam from laser 950 is indicated as 964 and is incident upon and passes through two Faraday isolators 968. The frequency modulated beam from the laser 954 is indicated as 966 and is also incident upon and passes through two Faraday isolators 970. The Faraday isolators provide the desired optical isolation. The beams 964, 966 are then coupled to a single optical fiber, either passively by means of a beam splitter, a star coupler or directional coupler 971 or by a frequency selective device. The two optical signals tranverse transmission path 972 and, if required, an optical amplifier 974. A 3 dB coupler, a star coupler or any other beam splitting means 976, located at the receiving end of the optical fiber is coupled to pass a portion of the frequency modulated optical beam to a first Fabry-Perot interferometer 978 and the remainder of the WDM optical beam to a second Fabry-Perot interferometer 980. Direct detection receivers 982, 984 are coupled to receive and detect the desired optical signals which pass through their associated Fabry-Perot interferometers. The Fabry-Perot interferometers are frequency-locked to the logic "one" of the frequency shift keyed signals by means of a feedback control 986, 988 coupled between the Fabry-Perot interferometer and the direct detection receiver to maximize receiver photocurrent. In operation, the laser 950 and 954 each generate distinct non-interfering wavelengths and the Fabry-Perot interferometers are designed to pass only the wavelength of interest from its associated laser.

Referring further to FIG. 9, when a multiplicity of laser diodes are used, it may be desirable to use passive star couplers, or frequency selective couplers for the beam splitting means 971, 976. In this instance, a passive single mode star coupler or frequency selective coupler can provide network access to a multiplicity of users well in excess of one hundred. Using frequency-division multiplexing, each active user pair can be assigned one of a number of optical carrier frequencies for a session to provide the frequency-division-multiple-access (FDMA) network. It has been determined that channel spacing ($f_c$) can be as low as 6.4 B for a single fiber Fabry-Perot and 3 B for two fiber Fabry-Perot in tandem, where B is the bit rate, with negligible power penalty. In addition, the laser linewidth ($f_e$) should be $\lesssim 0.1$ B. A network using two 45-M bits/s frequency-shift-keyed laser channels at 1.5 um and having a minimum channel spacing of about 6 times bit rate B operated satisfactorily with a single fiber Fabry-Perot. If a tandem Fabry-Perot cavity is used, then channel spacing can be reduced to approximately 3 times bit rate B. See *Electronics Letters*, Vol. 23, No. 21, pp. 1102–1103 (Oct. 8, 1987) by I. P. Kaminow, et al, which is incorporated herein and made a part of this disclosure. Estimates show that a network having 1000 users, independent of bit rate, is possible with a tandem fiber Fabry-Perot cavity. For B=1G bit/sec per channel the network capacity can be 1 T bit/s.

The number of channels which are possible for a single Fabry-Perot can be expressed as $$N \approx \frac{F}{6.4}$$

where F is finesse value of the single Fabry-Perot.

The number of channels which are possible for a tandem Fabry-Perot of substantially equal length can be expressed as $$N = 0.011 F^2$$

where F is the effective finesse of the two Fabry-Perots; and, the number of channels which are possible for a tandem Fabry-Perot of substantially different lengths can be expressed as $$N = 0.03 F^2$$

where F is the effective finesse of the two Fabry-Perots.

Derivation of the above noted relationship are more fully expressed in the *Journal of Lightwave Technology*, Vol. 6, No. 9, pp. 1406–1414 (Sept. 1988) by I. P. Kaminow et al, which is incorporated herein and made a part of this disclosure.

Thus, there is disclosed a transmission system which comprises Frequency-Shift Keying modulation in combination with optical (incoherent) demodulation using a Fabry-Perot interferometer. Clearly, with Frequency-Shift Keying Modulation, the semiconductor laser is not turned off-and-on and, therefore, the power of the signal being transmitted is relatively constant. Thus, as the power of the signal being transmitted is relatively constant, it is now possible to use an optical amplifier 974 in place of several regenerators at a repeater station for amplifying the multiplicity of wavelength division multiplexed signals being transmitted. As noted above, with Amplitude Shift Keying modulation, the signal being transmitted goes from a minimum value—usually zero—to a relatively large value. Optical amplifiers will give rise to cross talk between the various channels when the signal is Amplitude Shift Key modulated. However, in the optical Frequency Shift Keyed modulation transmission system here disclosed, the optical signal being transmitted does not exhibit large variations of power. Therefore, and particularly if several systems are wavelength division multiplexed onto a signal fiber path, an optical amplifier can be used in place of the many regenerators at the various repeater stations. Specifically, the savings in cost per repeater station can be substantial. In addition, if it proves feasible to place optical amplifiers at all repeater stations in a given route, adding capacity to such a route will require adding only additional terminals with terminal generation operating at different wavelengths; repeater stations remain unchanged. Thus, even if the optical amplifier were to cost the same as the regenerator, a savings will be realized.

Thus, with the constant intensity modulation system here disclosed, that being the use of Frequency Shift Keying modulation of lasers and Fabry-Perot interferometer for channel selection and/or Frequency Shift Keying to Amplitude Shift Keying at the receiver—not at the transmitter—it is now possible to have a system which can operate with substantially reduced laser modulation drive current; has the ability to replace regenerators with optical amplifiers; and provides more precise control of the spectrum of the optical beam.

Furthermore, in the case of a transmission system where normally several wavelength division multiplexed channels are transmitted, each with a distinct but fixed frequency, it is possible to use frequency selective couplers to multiplex and demultiplex channels with substantially less loss than would be obtained if a non-frequency selective coupler, such as a star coupler, were used.

We claim:

1. An optical communication system comprising a single-electrode distributed feedback laser diode,
   modulation means coupled to shift the frequency of the optical signal from said laser diode between a first frequency and a second frequency, said first and second frequencies representing logic ones and zeros, to provide frequency-shift keyed modulation of the optical signal from said laser diode, where the differential of frequency between the ones and zeros (fd) divided by the modulation frequency (B) is equal to or greater than one,
   an optical fiber for transmitting the frequency-shift keyed optical signal from said laser diode to a remote location, and
   a demodulator coupled to said optical fiber at said remote location, said demodulator having a passband which passes one of said frequencies and blocks the others of said frequencies.

2. An optical communication system in accordance with 1 wherein said demodulator in a Febry-Perot interferometer.

3. An optical communication system in accordance with claim 2 wherein said Fabry-Perot interferometer is a fiber Fabry-Perot.

4. An optical communication system in accordance with claim 2 wherein said Fabry-Perot interferometer is a tandem fiber Fabry-Perot.

5. An optical communication system in accordance with claim 1 wherein the differential of frequency between the ones and zeros (fd) divided by the modulation frequency (B) is substantially 3.2.

6. An optical communication system comprising a first single-electrode distributed feedback laser diode,
   a first modulation means coupled to shift the frequency of the optical signal from said first laser diode between a first frequency and a second frequency, said first and second frequencies representing logic ones and zeros, to provide frequency-shift keyed modulation of the optical signal from said laser diode, where the differential of frequency between the ones and zeros (fd) divided by the modulation frequency (B) is equal to or greater than one, a second single-electrode distributed feedback laser diode, a second modulation means coupled to shift the frequency of the optical signal from said second laser diode between a third frequency and a fourth frequency, said third and fourth frequencies representing logic ones and zeros, to provide frequency-shift keyed modulation of the optical signal from said laser diode, where the differential of frequency between the ones and zeros (fd) divided by the modulation frequency (B) is greater than are, an optical fiber for transmitting the frequency-shift keyed optical signals from said first and second laser diodes to a remote location, a first demodulator coupled to said optical fiber at said remote location, said demodulator having a passband which passes one of said frequencies from said first modulation means and blocks the other of said frequencies, and a second demodulator coupled to said optical fiber at said remote location, said demodulator having a passband which passes one of said frequencies from said second modulation means and blocks the other of said frequencies.

7. An optical communication system in accordance with claim 6 wherein said first demodulator means comprises a first Fabry-Perot interferometer, and said second demodulator means comprises a second Fabry-Perot interferometer.

8. An optical communication system in accordance with claim 6 comprising a single mode star coupler to couple said first and second laser diodes to said optical fiber.

9. An optical communication system in accordance with claim 7 wherein said demodulation means comprises a tandem Fabry-Perot interferometer.

* * * * *

UNITED STATES PATENT AND TRADEMARK OFFICE
CERTIFICATE OF CORRECTION

PATENT NO. : 5,027,435                    Page 1 of 2

DATED      : June 25, 1991

INVENTOR(S) : A.R. Chraplyvy, etal.

It is certified that error appears in the above-identified patent and that said Letters Patent is hereby corrected as shown below:

Title page: The sheet of drawing consisting of fig. 9 should be added as shown on the attached page.

Signed and Sealed this

Thirteenth Day of October, 1992

Attest:

DOUGLAS B. COMER

*Attesting Officer*          Acting Commissioner of Patents and Trademarks